March 21, 1961 F. J. SOMES, JR 2,975,512
METHOD OF INSTALLING AN ELECTRICAL SYSTEM
Original Filed Feb. 28, 1955 7 Sheets-Sheet 1
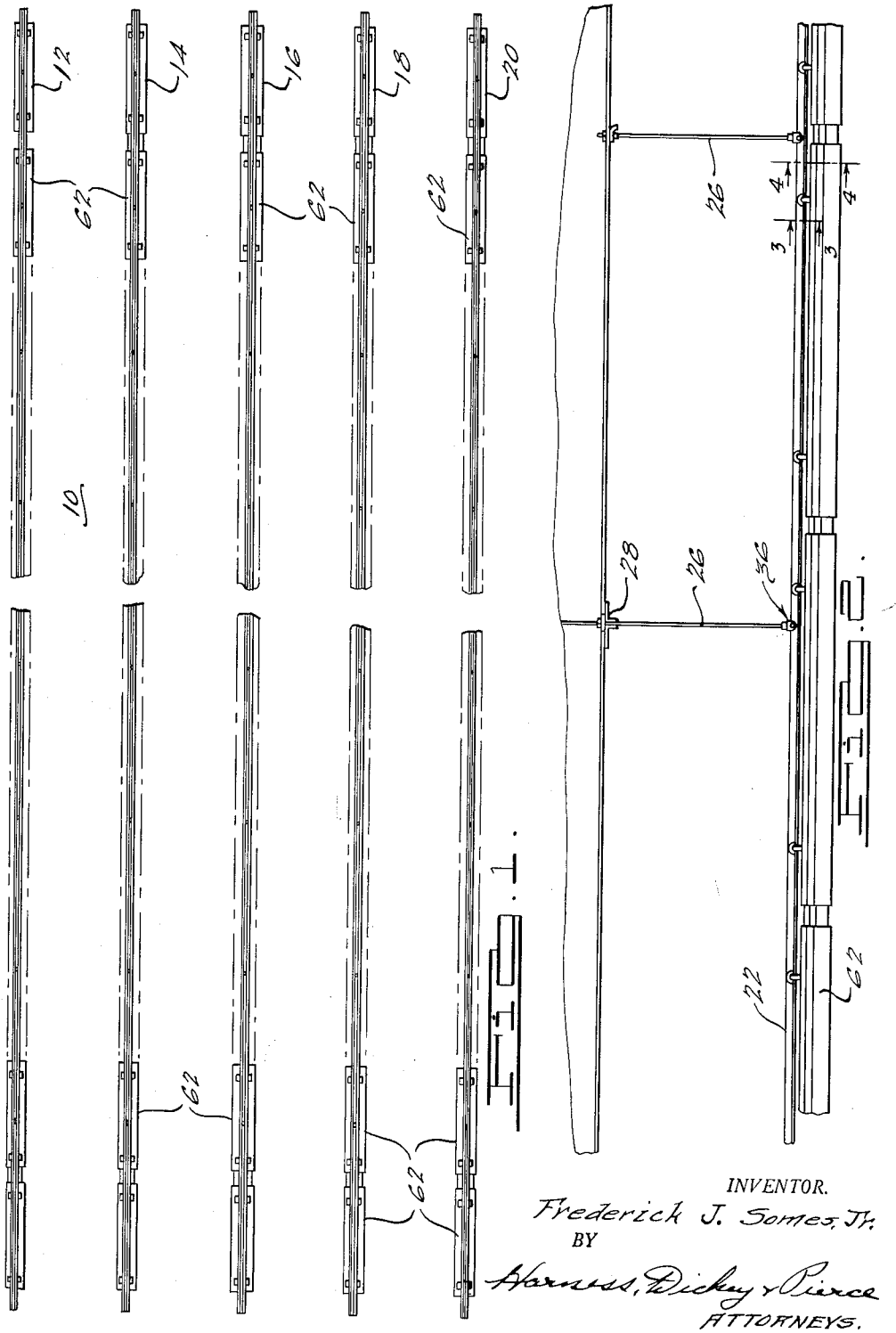
INVENTOR.
Frederick J. Somes, Jr.
BY
Harness, Dickey & Pierce
ATTORNEYS.

March 21, 1961 F. J. SOMES, JR 2,975,512
METHOD OF INSTALLING AN ELECTRICAL SYSTEM
Original Filed Feb. 28, 1955 7 Sheets-Sheet 2
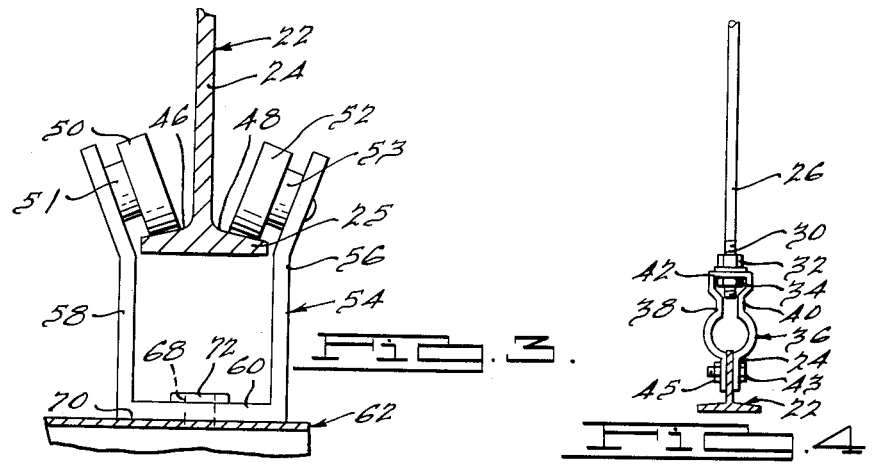
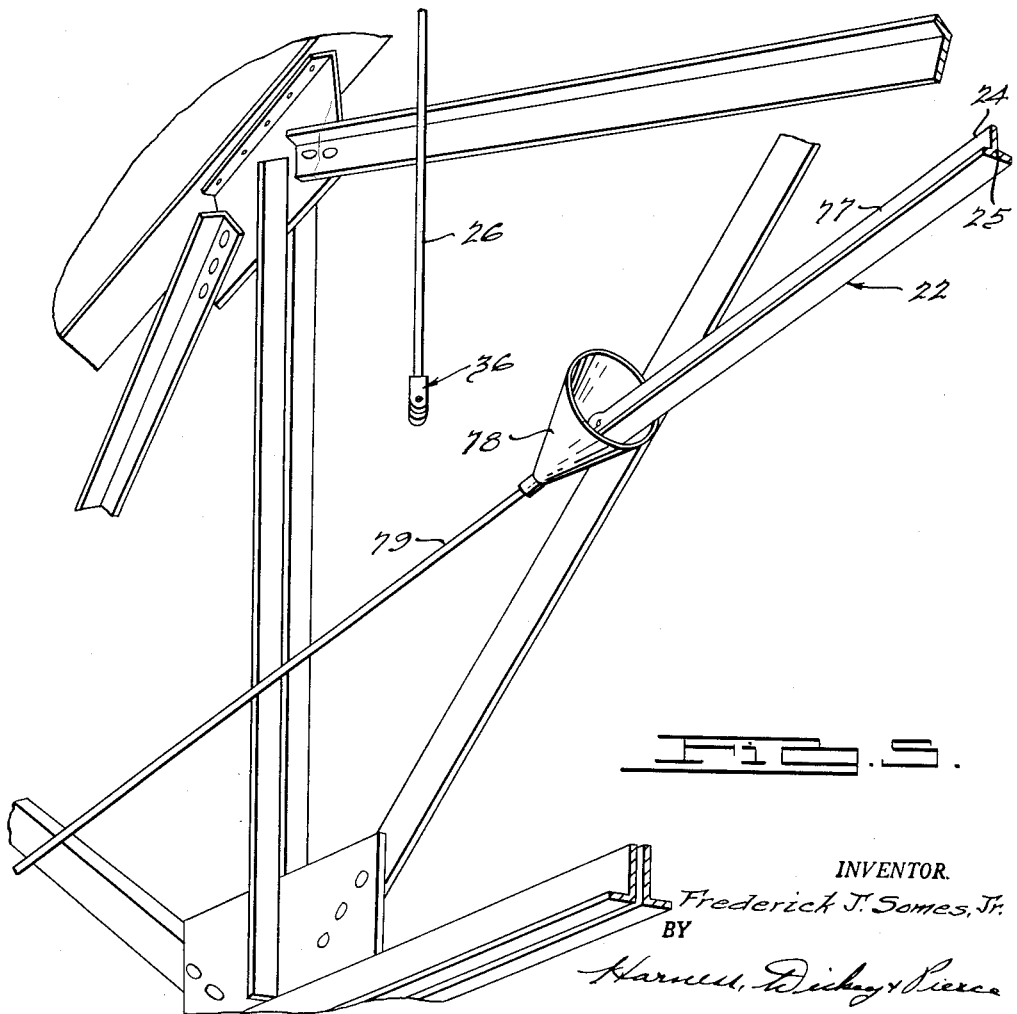
INVENTOR.
Frederick J. Somes, Jr.
BY
ATTORNEYS.

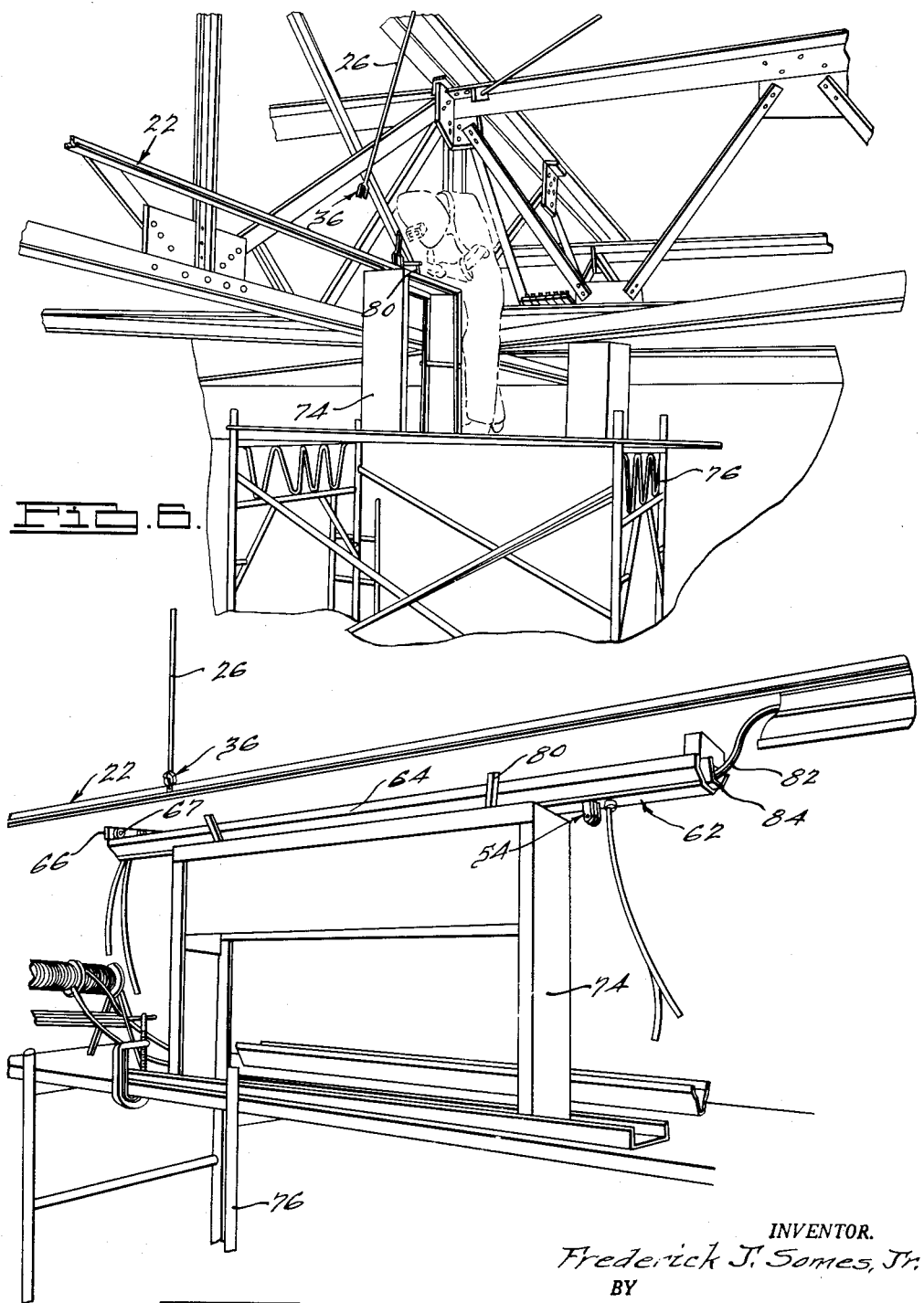

March 21, 1961     F. J. SOMES, JR     2,975,512
METHOD OF INSTALLING AN ELECTRICAL SYSTEM
Original Filed Feb. 28, 1955     7 Sheets-Sheet 4

INVENTOR.
Frederick J. Somes, Jr.
BY
Harness, Dickey & Pierce
ATTORNEYS.

March 21, 1961 F. J. SOMES, JR 2,975,512
METHOD OF INSTALLING AN ELECTRICAL SYSTEM
Original Filed Feb. 28, 1955 7 Sheets-Sheet 5

INVENTOR.
Frederick J. Somes, Jr.
BY
Harness, Dickey & Pierce
ATTORNEYS.

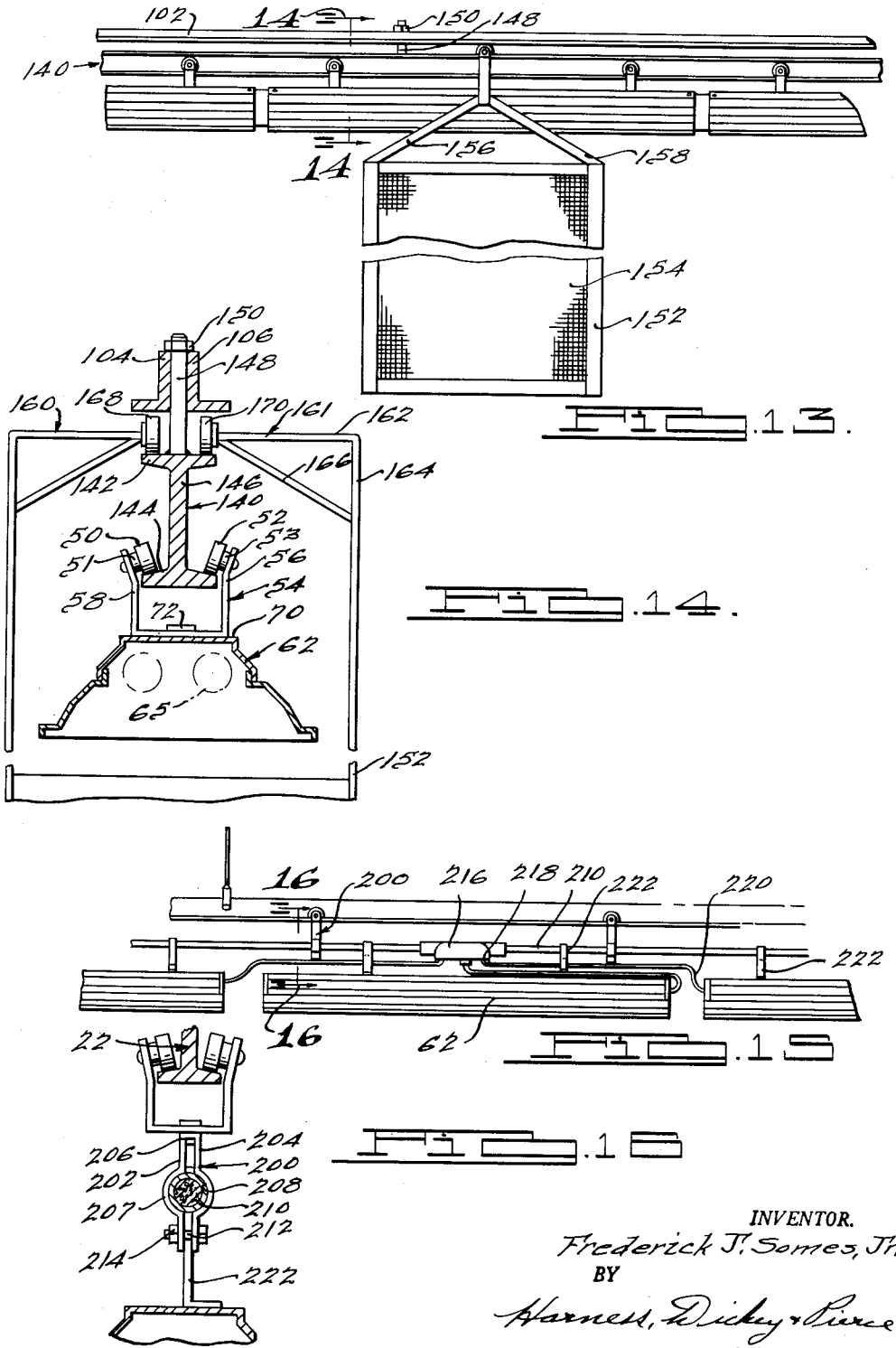

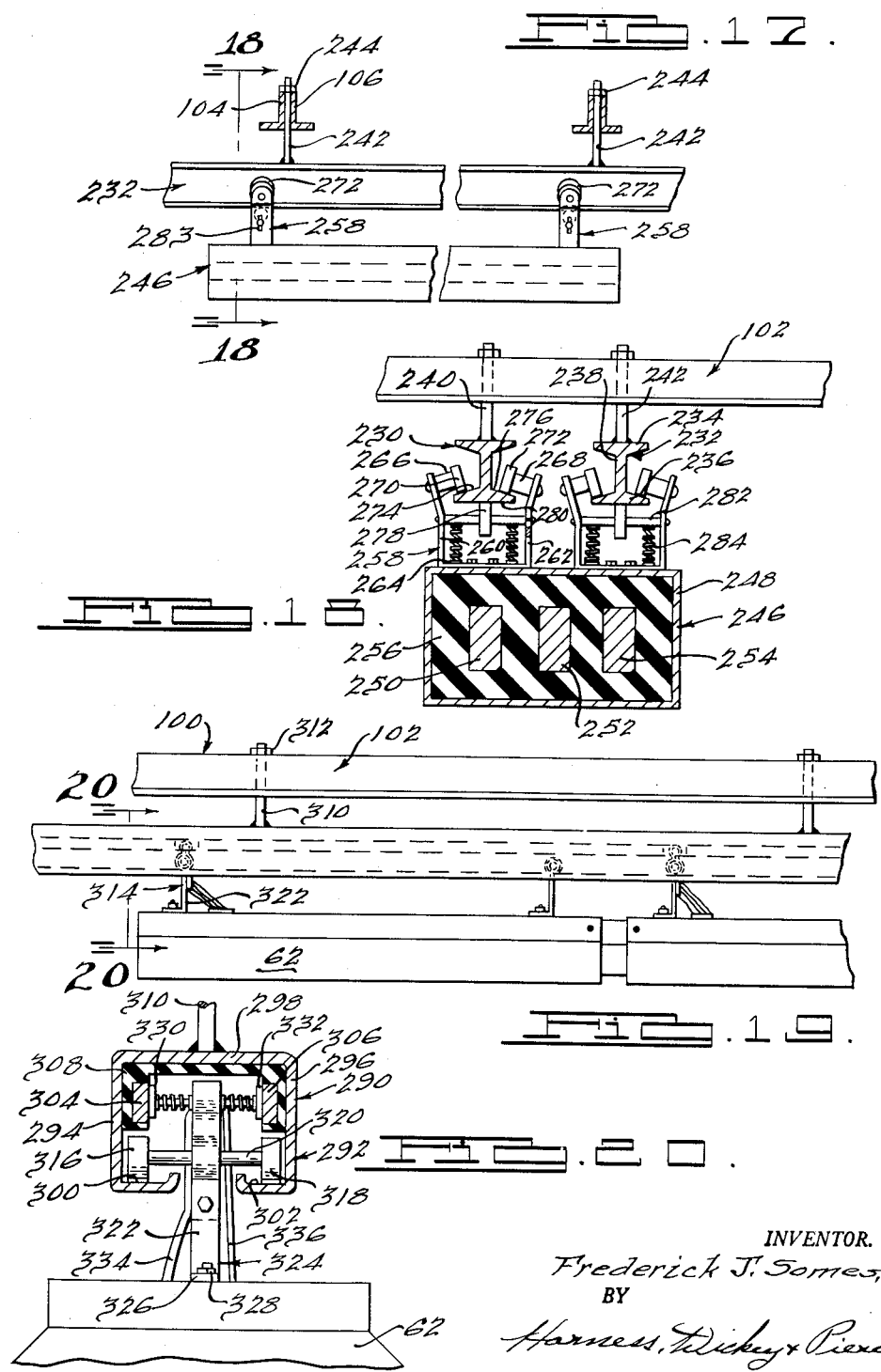

United States Patent Office 2,975,512
Patented Mar. 21, 1961

2,975,512

METHOD OF INSTALLING AN ELECTRICAL SYSTEM

Frederick J. Somes, Jr., Detroit, Mich., assignor to General Electric Company, a corporation of New York Original application Feb. 28, 1955, Ser. No. 490,963. Divided and this application Aug. 2, 1956, Ser. No. 601,832

5 Claims. (Cl. 29—429)

This application is a division of the applicant's copending application, Serial No. 490,963, filed February 28, 1955, for Electrical System and Method of Installing the Same.

An object of the invention is to overcome disadvantages in prior electrical systems and to provide an improved electrical system particularly adapted for relatively large installations.

Another object of the invention is to provide an improved electrical system incorporating improved means which reduces the time, labor and expense required to install the system to a minimum.

Another object of the invention is to provide an improved electrical system that is economical to manufacture, durable, efficient and reliable in operation.

Another object of the invention is to provide an improved electrical system incorporating improved means which facilitates the efficient maintenance of the system with a minimum of labor and expense.

Another object of the invention is to provide an improved electrical system which may be installed in a wide variety of structures of various sizes and types.

Another object of the invention is to provide an improved method of installing an electrical system which facilitates the rapid installation of relatively large electrical systems with a minimum of equipment, labor and expense.

Still another object of the invention is to provide an improved method of installing an electrical system which facilitates the installation of an electrical system with a minimum of interference with other equipment or personnel located in the area in which the system is being installed.

Yet another object of the invention is to provide an improved method of installing an electrical system which materially increases the efficiency of the workmen installing the system.

The above, as well as other objects and advantages of the present invention, will become apparent from the following description, the appended claims and the accompanying drawings wherein:

Figure 1 is a fragmentary top plan view of one embodiment of an electrical system incorporating the present invention;

Fig. 2 is an enlarged side elevational view of a portion of the structure illustrated in Fig. 1;

Fig. 3 is an enlarged sectional view of a portion of the structure illustrated in Fig. 2, taken on the line 3—3 thereof;

Fig. 4 is an enlarged sectional view of a portion of the structure illustrated in Fig. 2, taken on the line 4—4 thereof;

Fig. 5 is a perspective view illustrating one step in the method of installing the electrical system illustrated in Fig. 1;

Fig. 6 is a perspective view illustrating another step in the method of installing the electrical system illustrated in Fig. 1;

Fig. 7 is a perspective view of another step in the method of installing the electrical system illustrated in Fig. 1;

Fig. 13 is a fragmentary side elevational view of another embodiment of the invention;

Fig. 14 is a fragmentary transverse sectional view of a portion of the structure illustrated in Fig. 13, taken on the line 14—14 thereof;

Fig. 15 is a fragmentary side elevational view of another embodiment of the invention;

Fig. 16 is a transverse sectional view of a portion of the structure illustrated in Fig. 15, taken on the line 16—16 thereof;

Fig. 17 is a fragmentary side elevational view of another embodiment of the invention;

Fig. 18 is a transverse sectional view of the structure illustrated in Fig. 17, taken on the line 18—18 thereof;

Fig. 19 is a fragmentary side elevational view of another embodiment of the invention; and Fig. 20 is a transverse sectional view of the structure illustrated in Fig. 19, taken on the line 20—20 thereof.

Figure 8:
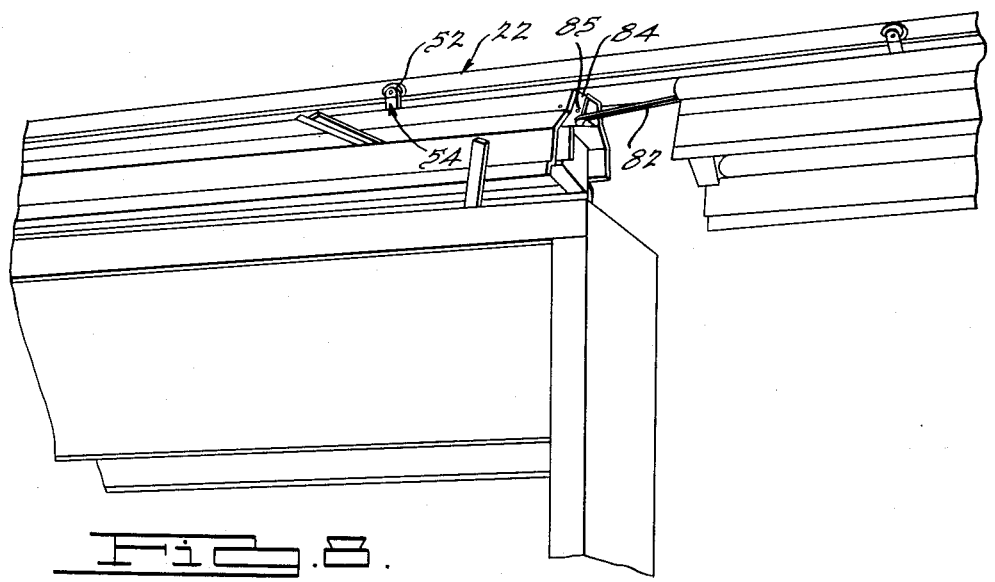
Fig. 8 is a perspective view illustrating another step in the method of installing the electrical system illustrated in Fig. 1.
Figure 9:
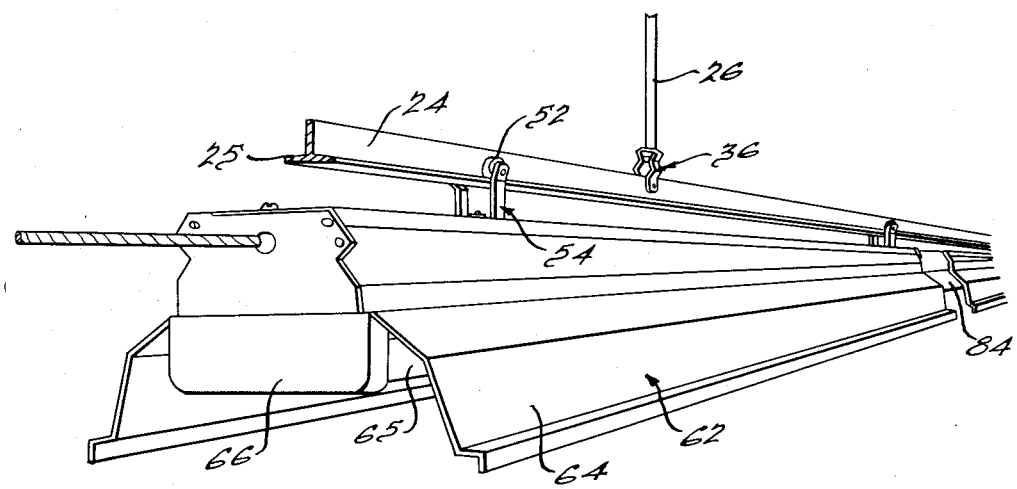
Fig. 9 is a perspective view of another step in the method of installing the electrical system illustrated in Fig. 1.

In general, the method of installing an electrical system includes the steps of joining a plurality of initially separate sections of a support member in end-to-end relationship to form an elongate unitary structure, the sections being joined at a particular location such as at one end of a proposed line of electrical fixtures, and the sections being successively joined and moved along a predetermined path; supporting the unitary support member at spaced intervals; assembling a plurality of electrically conducting elements at substantially the same location at which the sections of the support member were joined; successively mounting said elements on said support member for movement therealong; mechanically joining adjacent elements in end-to-end relationship; electrically connecting said adjacent elements; moving said joined elements a predetermined distance along said support member; and thereafter successively mounting the remaining electrical elements on said support member, mechanically and electrically connecting adjacent elements in end-to-end relationship, and moving the connected elements a predetermined distance along the support member until all of the elements have been mounted on the support member and joined together electrically and mechanically. The present invention thus facilitates the rapid installation of a relatively large electrical system with a minimum of labor, equipment and expense. Furthermore, the method of the present invention materially increases the efficiency of the workmen installing the system, and the method of the present invention also facilitates the installation of an electrical system with a minimum of interference with other equipment or personnel located in the area in which the system is being installed.

Referring to the drawings, and more particularly to Figs. 1–9, one embodiment of the present invention is shown incorporated in a fluorescent lighting system, although it will be understood that the present invention is applicable to other types of electrical systems.

Referring to Fig. 1, a lighting system, generally designated 10, is illustrated which is comprised of a plurality of spaced substantially parallel rows 12, 14, 16, 18 and 20 of fluorescent lighting fixtures. Each of the rows may, for example, extend for several hundred feet, the lighting system 10 being particularly adapted for installation in factories and other relatively large buildings. In the embodiment of the invention illustrated in Figs. 1–9, each of the rows 12, 14, 16, 18 and 20 is comprised of an elongate inverted T-sectioned support rail 22 which includes a plurality of sections joined together in end-to-end relationship to form a unitary structure, the individual sections being of any desired or convenient length. The support rail 22 includes a web portion 24 disposed in a substantially vertical plane, and a horizontally extending flange portion 25 integrally joined to the web portion 24. A plurality of spaced, vertically extending stringers 26 are provided, the upper end portions of which are fixed to the roof trusses or other desired supporting structure of the building. Any desired or conventional means may be employed to fix the upper end portions of the stringers 26 to the roof trusses. For example, the stringers 26 may be clamped to the roof trusses, as at 28. The lower end portions of the stringers 26 are threaded, as at 30, for the reception of nuts 32 and 34. A plurality of generally U-shaped clamping members 36 are provided, each having a pair of depending side portions 38 and 40 integrally joined by a web portion 42. The lower end portion of each stringer 26 projects through an aperture in the web portion 42 of the associated clamping member, and the web portion 42 is retained on the stringers 26 by the nuts 32 and 34. In order to secure the inverted T-rail to the clamping members 26, the web portion 24 of the inverted T-rail 22 is positoned intermediate the side portions 38 and 40 of the clamping members and secured thereto by bolts 43 which extend through the side portions of the clamping members and the web portion of the inverted T-rail, the bolts being retained by nuts 45. The upper surfaces 46 and 48 of the flange portion 25 of the T-rail extend angularly outwardly and downwardly and serve as ways upon which are mounted rollers 50 and 52. The rollers 50 and 52 are journaled on pins 51 and 53 carried by a generally U-shaped bracket 54 having spaced upwardly projecting flanges 56 and 58 integrally joined by a web 60, the upper end portions of the flanges 56 and 58 projecting angularly outward, as viewed in Fig. 3, so that the rollers 50 and 52 are substantially normal to the surfaces 46 and 48 of the flange 25.

A plurality of fluorescent lighting fixtures 62 are provided which are disposed in end-to-end relationship and which extend for substantially the entire length of each of the rows 12, 14, 16, 18 and 20. Each of the fluorescent units 62 includes a housing 64, the inner surfaces of which serve to reflect the light emitted from the fluorescent lamps 65. The light fixtures 62 also include end members 66 which carry the fluorescent lamp sockets 67 and which partially close the end portions of the housing 64. One of the brackets 54 is secured to each end portion of each housing 64 as, for example, by bolts 68 which project through the web 60 of the associated bracket 54 and through the top wall 70 of the housing 64, the bolts 68 being retained by nuts 72.

The lighting system of the present invention is particularly adapted to be installed substantially from one end of each desired row of fluorescent lighting fixtures. In the installation of the lighting system, a workbench 74 is provided which is mounted on a scaffold 76 that serves to raise the workbench 74 to the desired height, the scaffold 76 being located at one end of the proposed row of fluorescent lighting fixtures, and stringers 26 are installed at spaced intervals along the proposed row of lighting fixtures in the manner previously described. The unitary elongate T-rail 22 is then formed from sections of T-rail of any convenient length as, for example, sections approximately twenty feet long, the sections being welded or otherwise joined together in end-to-end relationship. As shown in Fig. 5, one end of the first section 77 of the T-rail is connected by a conventional connector 78 to a winch-actuated cable 79 which extends along the proposed row of lighting fixtures. The opposite end of the first section 77 is then welded to an adjacent section of T-rail, as shown in Fig. 6, suitable clamps 80 being provided on the workbench 74 to facilitate holding the adjacent sections of the T-rail during the welding operation. After the first two sections of the T-rail have been welded together, the welder signals the winch operator, and the winch operator pulls such first two welded sections along the proposed row of fixtures a sufficient distance so that another section may be welded to the free end of the second section. The sections of the T-rail are thus successively welded and pulled by the winch along the proposed line of fixtures until the T-rail has been completely assembled. After all of the T-rail sections of the T-rail have been joined together, the web portion 24 of the T-rail is fixed to the stringers 26 by the clamps 36 in the manner previously described.

As shown in Fig. 7, the fluorescent light fixtures 62 are then assembled on the same workbench 74 that was initially employed by the welder. After each individual fluorescent fixture 62 is assembled, the brackets 54 are secured to the top wall 70 of each light fixture in the manner previously described, and the assembled light fixture is then mounted on the T-rail so that the rollers 50 and 52 engage the surfaces 46 and 48 of the flange portion of the T-rail. As the assembled fluorescent light fixtures are mounted on the T-rail, adjacent light fixtures are electrically connected together by conductors 82, as shown in Fig. 8. The housings 64 of adjacent fixtures 62 are also mechanically connected together by connecting members 84 which may be of substantially the same configuration as the housings 64, the side portions of the connecting members 84 being fixed to the housings 64 of adjacent fixtures 62 by screws 85. The fixtures 62 are thus successively assembled, mounted on the T-rail, electrically and mechanically connected to the adjacent fixture, and moved along the T-rail until the entire row is completed.

From the above description, it will be apparent that each row of lighting fixtures may be substantially installed from one end of each row, thereby reducing the time, labor and expense required to install each row of lighting fixtures to a minimum. Furthermore, the lighting fixtures may be installed with a minimum of interference with other equipment or personnel in the area in which the lighting system is installed.

Figure 10:
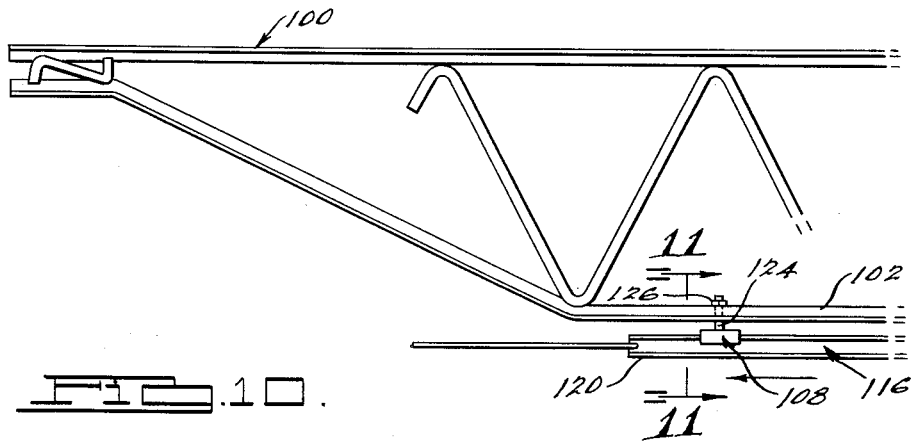
Fig. 10 is a fragmentary side elevational view of another embodiment of the invention.
Figure 11:
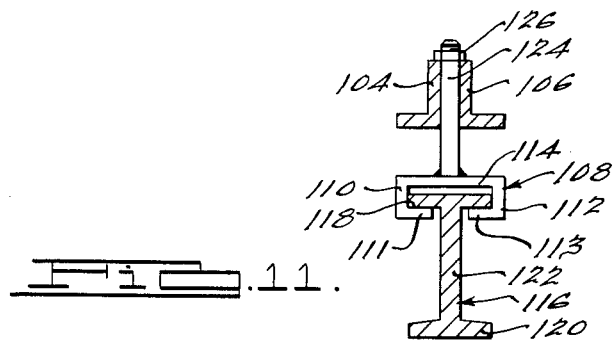
Fig. 11 is a sectional elevational view of a portion of the structure illustrated in Fig. 10, taken on the line 11—11 thereof.
Figure 12:
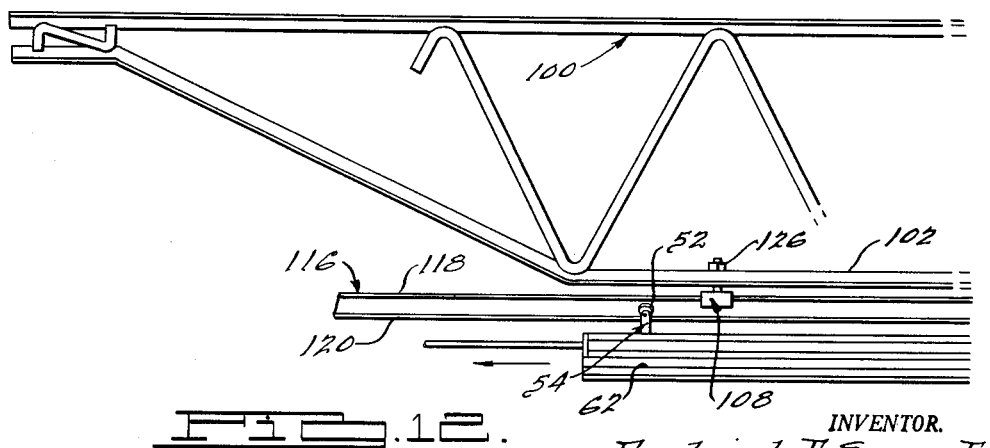
Fig. 12 is a side elevational view illustrating the manner in which the fluorescent light fixtures are installed in the embodiment of the invention illustrated in Fig. 11.

Another embodiment of the invention is illustrated in Figs. 10, 11 and 12, this embodiment of the invention being shown in installed relationship with respect to a roof truss 100 of a known type. Roof trusses of the type illustrated include a lower chord member 102 which is comprised of spaced substantially parallel angle members 104 and 106 disposed in spaced back-to-back relationship, the angle members 104 and 106 being connected to each other at spaced intervals, as by blocks disposed between the angle members and welded thereto. In this embodiment of the invention, a plurality of spaced support members 108 are provided, each having spaced side flanges 110 and 112 integrally joined by a web 114. The free end portions 111 and 113 of the flanges 110 and 112, respectively, are bent inwardly in spaced substantially parallel relationship with respect to the web portion 114, the ends of the flanges 110 and 112 terminating in spaced relationship with respect to each other, as shown in Fig. 11. The portions 111 and 113 of the flanges 110 and 112 serve as ways which are adapted to support an elongate, I-sectioned support rail, generally designated 116, comprised of a plurality of sections of any desired or conventional length, the sections being welded or otherwise fixed together in end-to-end relationship to form a unitary structure which extends for substantially the entire length of the desired row of light fixtures. The support rail 116 includes spaced flanges 118 and 120 which are joined by a web 122, the flange 118 engaging the portions 111 and 113 of the flanges 110 and 112, while the web 122 is disposed intermediate the free ends of the portions 111 and 113.

The web 114 of each connecting member 108 is fixed to the lower chord 102 of the roof truss by a bolt 124 which projects upwardly intermediate the angle members 104 and 106, the lower end portion of the bolt 124 being welded or otherwise fixed to the web portion 114 of the support member 108 while the upper end portion of the bolt is retained by a nut 126 which threadably engages the upper end portion of the bolt.

The support members 108 are adapted to support the rail 116 at spaced intervals, the flange portion 118 projecting through each support member 108 and slidably engaging the inner surfaces of the inwardly bent portions 111 and 113 of the flanges 110 and 112 of the support members. The web portion 122 of the rail projects downwardly intermediate the free ends of the flanges 110 and 112 and the flange 120 is adapted to support the rollers 50 and 52 being rotatably mounted on the pins 51 and 53 carried by the flange portions 56 and 58 of the brackets 54, in the manner previously described, and the fluorescent fixtures 62, in turn, being supported by the brackets 54.

In the installation of this embodiment of the invention, the support members 108 are fixed to the lower chord 102 of the roof truss 100 at spaced intervals through the agency of the bolts 124, the web portion 114 of each support member 108 extending in a direction substantially perpendicular to the proposed line of fluorescent lighting fixtures. As previously mentioned, the rail 116 is comprised of elongate sections of any convenient length, as, for example, sections approximately twenty feet long. The sections of the rail 116 are welded together in end-to-end relationship at one end of the proposed row of fluorescent fixtures in the manner previously described, the first section of the I-rail 116 being connected to a winch-actuated cable which extends along the proposed row of lighting fixtures. After the opposite end of the first section has been welded to the adjacent section of the rail 116, the welded sections are pulled through the support member 108 adjacent the workbench so that the flange 118 of the rail 116 engages the inwardly bent portions 111 and 113 of the flanges 110 and 112. The sections of the rail 116 are then successively welded and pulled along the proposed row of fixtures through the spaced support members 108 so that the rail 116 is supported as it is moved along the proposed row of lighting fixtures. After the rail 116 has been installed, the individual fluorescent light fixtures may be assembled and mounted on the rail 116, the rollers 50 and 52 engaging the upper surfaces of the flange 120 of the rail 116. As the light fixtures are assembled, they are successively mounted on the rail 116, electrically and mechanically connected to the adjacent fixture, and moved along the rail 116 in the manner previously described until the entire installation is completed.

Another embodiment of the invention is illustrated in Figs. 13 and 14. In this embodiment of the invention a generally I-sectioned support rail 140 is provided which is comprised of a plurality of sections of convenient length joined together in end-to-end relationship to form a unitary structure, the rail having spaced substantially parallel flanges 142 and 144 joined by a web 146. In this embodiment of the invention, the rail 140 is suspended from the lower chord 102 of the roof truss by a plurality of spaced bolts 148, the lower end portions of which are welded to the flange 142 of the rail 140 at spaced intervals. The upper end portions of the bolts 148 project through the lower chord 102 of the roof truss intermediate the angle members 104 and 106, the upper end portion of each bolt 148 being threaded to receive nuts 150 which engage the upper edges of the angle members 104 and 106.

In this embodiment of the invention, a maintenance car, generally designated 152, is provided which is adapted to carry a maintenance worker, the maintenance car 152 including a cage 154 which is sufficiently large to carry the maintenance worker during maintenance of the fixtures. The maintenance car is provided with angularly upwardly extending frame members 156 and 158 on the opposite sides thereof, and the frame members 156 and 158 are fixed to supporting brackets 160 and 161. In the embodiment of the invention illustrated, the supporting brackets 160 and 161 are generally triangular and include a horizontally extending member 162, a vertically extending member 164 and an angularly extending brace 166. Rollers 168 and 170 are journaled on the inner ends of each of the support brackets 160 and 161, the rollers 168 and 170 being adapted to engage and roll along the upper surfaces of the flange 142 of the rail 140. The fluorescent lighting fixtures 62 are mounted on the flange 144 of the rail 140 in the manner described in connection with the embodiment of the invention illustrated in Figs. 10, 11 and 12, the rollers 50 and 52 carried by the bracket 54 engaging the flange 144 of the rail 140 and being adapted to roll therealong.

In the installation of this embodiment of the invention, the rail 140 may be assembled on the workbench 74 disposed at one end of the proposed row of lighting fixtures, the sections of the rail 140 being welded together in end-to-end relationship and successively welded and moved along the proposed row of lighting fixtures. After the sections of the rail 140 have been joined, the rail is suspended from the lower chord of the truss by the bolts 148. After the rail 140 has been installed, the individual lighting fixtures may be assembled and installed at one end of the rail 140 in the manner previously described.

From the above description, it will be apparent that this embodiment of the invention may be maintained and repaired with a minimum expenditure of time, labor and expense. The maintenance car 152 may be mounted on the rail 740 of each row of fixtures as, for example, by the use of a lift truck, after which the maintenance worker may roll himself along the rail 140 from fixture to fixture and the individual fixtures cleaned or otherwise maintained or repaired with a minimum of time being required to enable the maintenance worker to move from fixture to fixture. At the same time, this embodiment of the invention obviates the necessity of providing separate supporting structure for the maintenance car.

Another embodiment of the invention is illustrated in Figs. 15 and 16, this embodiment of the invention including the stringers 26 and the T-rail 22 which may be installed in the manner previously described. In this embodiment of the invention, a plurality of spaced clamping members 200 are provided each having side portions 202 and 204 integrally joined at one end by a web portion 206. The side portions 202 and 204 each include a bight section 207, and the bight sections 207 cooperate to define a substantially circular opening 208 adapted to receive an electrical conduit 210. The free ends of the side portions 202 and 204 extend in substantially parallel relationship, as shown in Fig. 16, and a bolt 212 is inserted through the free end portions of the sides 202 and 204, the bolt being retained by a nut 214 so that the clamp 200 securely grips the conduit 210. In this embodiment of the invention, the conduit 210 extends along the proposed row of fluorescent fixtures, sections of the conduit 210 being connected by conventional condulets 216 at spaced intervals. The condulets include conventional sockets adapted to receive plugs 218, and the plugs 218 are electrically connected to the fluorescent lights mounted in the light fixtures, as, for example, by the conductors 220. In this embodiment of the invention, the light fixtures 62 are suspended from the conduits by hooks 222, and the fluorescent fixtures may be located at any desired position along the conduit 210 merely by mounting the fixtures on the conduit with the hooks 222 and inserting the plugs 218 into the nearest conduit 216.

In this embodiment of the invention, the T-sectioned rail is assembled and installed from one end of the proposed row of fixtures in the manner previously described. After the rail has been installed, the sections of the conduit 210 are installed from the same end of the row by fixing the clamps 200 to the conduit at spaced intervals, securing the clamps 200 to the brackets 56, and thereafter mounting the rollers 50 and 52 on the flange portion of the T-sectioned rail, the conduit being rolled along the rail through the agency of the rollers 50 and 52 and adjacent sections of the conduit being connected by the condulets 216. In the event additional fluorescent fixtures are required at a later date, such additional fixtures may be installed merely by hooking such fixtures onto the conduit and plugging the conductors 220 into the nearest condulet.

Another embodiment of the invention is illustrated in Figs. 17 and 18 and is particularly adapted for use in conduit feeder systems. In this embodiment of the invention, a pair of spaced substantially parallel, generally I-sectioned support rails 230 and 232 are provided, each having spaced substantially parallel flanges 234 and 236 joined by a web 238. In this embodiment of the invention, the rails 230 and 232 are shown as being suspended from the lower chord 102 of the roof trusses 100 so as to extend transversely thereof, although it will be understood that the rails 230 and 232 may extend in any desired direction with reference to the roof trusses. The rails 230 and 232 are supported by bolts 240 and 242, the lower end portions of which are welded to the top flang 234 of each of the rails at spaced intervals, while the upper end portions of such bolts project through the lower chords of the roof trusses intermediate the angle members 104 and 106, the upper end portions of the bolts being retained by nuts 244.

In this embodiment of the invention, a bus duct 246 is provided which includes a plurality of sections joined together in end-to-end relationship to form a unitary structure. The bus duct 246 includes a tubular member 248 that is substantially rectangular in cross section, and a plurality of spaced conductors 250, 252 and 254 are housed in the tubular member 248, the conductors 250, 252 and 254 extending longitudinally of the tubular member and being electrically insulated from each other and from the tubular member, as by the insulation 256. In order to support the bus duct 246 securely and rigidly, a plurality of brackets 258 are provided, the brackets 258 being disposed in pairs at spaced intervals along the bus duct 246. Each of the brackets 258 includes a pair of upwardly projecting spaced flanges 260 and 262 joined by a web 264. The upper end portions of the flanges 260 and 262 project angularly outwardly, as shown in Fig. 18, and carry pins 266 and 268 upon which are mounted rollers 270 and 272 which engage the upper surfaces 274 and 276 of the flanges 236 of each of the rails 230 and 232. In addition, each of the brackets 258 carries a spring-biased roller 278 which engages the lower surface 280 of the flange 236 of each of the rails, the rollers 278 being journaled on pins 282 mounted in slots 283 defined by the flanges 260 and 262 and biased toward the flange 236 by springs 284. Such a construction serves to limit the vertical movement of the bus duct and increases the rigidity of the installation.

In the installation of this embodiment of the invention, sections of the rails 230 and 232 are joined together in end-to-end relationship to form unitary structures, the individual sections of the rails being welded or otherwise joined together in end-to-end relationship at one end of the proposed line of the bus duct, and the individual sections of the rails being successively joined and pulled along the proposed line in the manner previously described. The rails 230 and 232 are then secured to the roof truss in spaced substantially parallel relationship by the bolts 242. After the rails 230 and 232 have been installed, brackets 258 are fixed to the bus duct 246 in spaced pairs, and the sections of the bus duct are mounted on the rails 230 and 232 so that the rollers 270 and 272 engage the flanges 236 of the rails, the sections of the bus duct being initially mounted on the rails at the mentioned one end of the proposed line of the bus duct. As the sections of the bus duct 246 are mounted on the rails 230 and 232, adjacent sections of the duct are electrically and mechanically connected together and rolled along the rails toward the distal ends of the rails.

From the above description, it will be apparent that the bus duct 246 is securely and rigidly mounted on the rails and that the installation of both the rails and the bus duct may be effected substantially from one end of the proposed line of the bus duct.

Another embodiment of the invention is illustrated in Figs. 19 and 20. In this embodiment of the invention, a support duct 290 is provided of the type conventionally known as trolley duct, the support duct including a plurality of sections of any desired length joined together in end-to-end relationship to form a unitary structure. Trolley ducts of the type illustrated include a housing 292 having spaced substantially parallel side walls 294 and 296 joined by a top wall 298. The lower end portions of the side walls 294 and 296 are return bent so as to define spaced ways 300 and 302 which extend longitudinally of the trolley duct. Electrical conductors 304 and 306 are mounted intermediate the side walls 294 and 296 of the housing 292, the conductors 304 and 306 being disposed in upwardly spaced relationship with respect to the ways 300 and 302, respectively, and extending longitudinally of the housing. The conductors 304 and 306 are electrically insulated from the housing, as by insulation 308.

The housing 292 is suspended from the lower chord 102 of the roof truss 100, as by bolts 310, the lower end portions of which are welded to the top wall 298 of the housing 292 at spaced intervals while the upper end portions of the bolts extend through the lower chord 102 and are retained by nuts 312.

A plurality of trolley members 314 are provided, each including a pair of rollers 316 and 318 journaled for rotation on a pin 320 carried by the vertically extending leg 322 of a generally L-shaped support member 324. The support member 324 also includes a horizontally extending leg 326 which is fixed to the top wall 70 of the fluorescent lighting fixtures 62, as by screws 328. A pair of spring-biased contact elements 330 and 332 are provided on alternate trolley members, the contact elements 330 and 332 slidably engaging the conductors 304 and 306, respectively, and being electrically connected to the lamp sockets of the fluorescent lighting fixtures by conductors 334 and 336.

In the installation of this embodiment of the invention, the sections of the trolley duct 290 are electrically and mechanically joined together in end-to-end relationship, the adjacent sections of the trolley duct being joined at one end of the proposed row of lighting fixtures and successively moved along such row. After the sections of the trolley duct 290 have been electrically and mechanically joined together, the housing 292 is suspended from the roof truss by the bolts 310 in the manner previously described. The lighting fixtures 62 are then assembled at the same location at which the sections of the trolley duct were joined at one end of the proposed row of fixtures, and the trolley members 314 are secured to the top wall of the light fixture housings. The rollers 316 and 318 of the trolley members 314 are then mounted on the ways 300 and 302 defined by the trolley duct, and adjacent fixtures are mechanically connected together by the connecting members 84 as they are mounted on the trolley duct, the adjacent fixtures being successively moved along the trolley duct toward the distal end thereof. The electrical connections to the fixtures are effected by the contacts 304 and 306 provided on alternate trolley members 314, the contacts 304 and 306 being electrically connected to the sockets of the lighting fixtures by the conductors 334 and 336.

While preferred embodiments of the invention have been shown and described, it will be understood that various changes and modifications may be made without departing from the spirit of the invention.

What is claimed is:

1. The method of installing an electrical lighting system including a plurality of lighting units and a support member comprised of a plurality of sections, which includes the steps of successively joining said sections of said support member in end-to-end relationship at a predetermined location so as to form a unitary structure, moving said sections from said location along a predetermined path, supporting said support member at spaced intervals, mounting one of said units on said support member at said location for rolling movement along said support member, moving said one unit from said location a predetermined distance along said support member, mounting another of said units on said support member at said location for rolling movement along said support member, connecting said mounted units in end-to-end relationship at said location, moving said connected units from said location a predetermined distance along said support member, and thereafter successively mounting additional units on said support member at said location, connecting said additional units at said location to the adjacent units on said support member, and moving said connected units from said location a predetermined distance along said support member so that all of said units are supported by said support member.

2. The method of installing an electrical system including a plurality of electrically conducting lighting fixtures and a support member comprised of a plurality of sections, which includes the steps of successively joining adjacent sections of said support member in end-to-end relationship at a predetermined location so as to form a unitary structure and moving said sections a predetermined distance from said location along a predetermined path, slidably supporting said support member, mounting one of said fixtures on said support member at said location for rolling movement along said support member, moving said one fixture from said location a predetermined distance along said support member, mounting another of said fixtures on said support member at said location for rolling movement along said support member, mechanically connecting said fixtures in end-to-end relationship at said location, electrically connecting said fixtures, moving said connected fixtures from said location a predetermined distance along said support member, and thereafter successively mounting additional fixtures on said support member at said location, mechanically and electrically connecting said additional fixtures to the adjacent fixtures on said support member, and moving said connected fixtures from said location a predetermined distance along said support member so that all of said connected fixtures are supported by said support member.

3. The method of installing an electrical power distribution system having a plurality of electrically conducting conduits and a support member comprised of a plurality of sections, which includes the steps of successively joining said sections of said support member in end-to-end relationship at a predetermined location, moving said sections from said location along a predetermined path, supporting said support member, mounting one of said conduits on said support member at said location for rolling movement along said support member, moving said one conduit from said location a predetermined distance along said support member, mounting another of said conduits on said support member at said location for rolling movement along said support member, connecting said conduits in end-to-end relationship at said location, moving said connected conduits from said location a predetermined distance along said support member, and thereafter successively mounting additional conduits on said support member at said location, connecting adjacent said additional conduits to the conduits on said support member, and moving said connected conduits from said location, a predetermined distance along said support member until all of said connected conduits are supported by said support member.

4. The method of installing an electrical power distribution system having a plurality of electrically conducting bus ducts and a support member comprised of a plurality of sections, which includes the steps of successively joining said sections of said support member in end-to-end relationship at a predetermined location, moving said sections from said location along a predetermined path, supporting said support member, mounting one of said ducts on said support member at said location for rolling movement therealong, moving said one duct from said location a predetermined distance along said support member, mounting another of said ducts on said support member at said location for rolling movement along said support member, connecting said ducts in end-to-end relationship, moving said connected ducts from said location a predetermined distance along said support member, and thereafter successively mounting additional ducts on said support member at said location, connecting said additional ducts to the adjacent elements on said support member, and moving said connected ducts from said location a predetermined distance along said support memeber until all of said connected ducts are supported by said support member.

5. The method of installing an electrical system having a plurality of electrically conducting light fixtures and a plurality of electrically conducting trolley ducts, which includes the steps of successively joining said trolley ducts in end-to-end relationship at a predetermined location, moving said trolley ducts from said location along a predetermined path, supporting said trolley ducts, mounting one of said fixtures on said trolley ducts at said location for rolling movement therealong moving said one fixture from said location a predetermined distance along said trolley ducts, mounting another of said fixtures on said trolley ducts at said location for rolling movement therealong, connecting said fixtures in end-to-end relationship, moving said connected fixtures from said location a predetermined distance along said trolley ducts, successively mounting additional fixtures on said trolley ducts at said location, connecting said additional fixtures to the adjacent fixtures on said trolley ducts, and moving said connected fixtures from said location a predetermined distance along said trolley ducts until all of said connected fixtures are supported by said trolley ducts.

References Cited in the file of this patent
UNITED STATES PATENTS

| | | |
|---|---|---|
| 1,108,748 | Hampton | Aug. 25, 1914 |
| 1,569,054 | Warner | Jan. 12, 1926 |
| 2,026,884 | Glasgow | Jan. 7, 1936 |
| 2,626,301 | Hammerly | Jan. 20, 1953 |